United States Patent
Boisjoli

(10) Patent No.: US 10,496,113 B2
(45) Date of Patent: Dec. 3, 2019

(54) AGRICULTURAL PRODUCT STORAGE SYSTEM INCLUDING ADAPTIVE CONDITIONING CONTROL FUNCTION DEPENDENT UPON STATE OF STORAGE

(71) Applicant: GrainX Incorporated, Winnipeg (CA)

(72) Inventor: Calvin Dale Boisjoli, Didsbury (CA)

( * ) Notice: Subject to any disclaimer, the term of this patent is extended or adjusted under 35 U.S.C. 154(b) by 37 days.

(21) Appl. No.: 16/007,609

(22) Filed: Jun. 13, 2018

(65) Prior Publication Data
US 2018/0364746 A1 Dec. 20, 2018

Related U.S. Application Data

(60) Provisional application No. 62/521,852, filed on Jun. 19, 2017.

(51) Int. Cl.
*G05D 23/19* (2006.01)
*G05D 22/02* (2006.01)
*A01F 25/22* (2006.01)

(52) U.S. Cl.
CPC ......... *G05D 23/1932* (2013.01); *A01F 25/22* (2013.01); *G05D 22/02* (2013.01)

(58) Field of Classification Search
None
See application file for complete search history.

(56) References Cited

U.S. PATENT DOCUMENTS

| | | | | |
|---|---|---|---|---|
| RE31,023 E | * | 9/1982 | Hall, III | A01D 46/24 |
| | | | | 137/236.1 |
| 4,599,809 A | * | 7/1986 | Parkes | F26B 25/22 |
| | | | | 34/484 |
| 5,810,540 A | * | 9/1998 | Castaldi | B65G 1/0435 |
| | | | | 414/280 |
| 5,932,172 A | * | 8/1999 | Winks | A23B 9/18 |
| | | | | 422/292 |
| 6,072,766 A | * | 6/2000 | Konshak | G11B 15/688 |
| | | | | 369/30.5 |
| 9,085,381 B2 | * | 7/2015 | Gengerke | B65B 1/32 |
| 9,551,737 B2 | * | 1/2017 | Bloemendaal | G01N 27/223 |
| 2013/0166157 A1 | * | 6/2013 | Schleicher | A01D 41/1278 |
| | | | | 701/50 |
| 2015/0023775 A1 | * | 1/2015 | Bonefas | A01D 43/087 |
| | | | | 414/813 |
| 2015/0177114 A1 | * | 6/2015 | Kapoor | G01B 21/20 |
| | | | | 702/128 |

* cited by examiner

*Primary Examiner* — Ramesh B Patel
(74) *Attorney, Agent, or Firm* — Ryan W. Dupuis; Ade & Company Inc.; Kyle R. Satterthwaite

(57) ABSTRACT

In an agricultural product storage system, product is stored in a bin having a condition sensor associated therewith and a conditioning device for conditioning the stored product when activated, for example an aeration fan. A controller in communication with the sensor and the conditioning device, operates the condition device in response to the sensed condition of the product according a selected one of a plurality of different control functions defining different control parameters of the conditioning device. The controller selects among the different control functions based upon the changing state of the of the storage bin.

20 Claims, 2 Drawing Sheets

AGRICULTURAL PRODUCT STORAGE SYSTEM INCLUDING ADAPTIVE CONDITIONING CONTROL FUNCTION DEPENDENT UPON STATE OF STORAGE

This application claims the benefit under 35 U.S.C. 119(e) of U.S. provisional application Ser. No. 62/521,852, filed Jun. 19, 2017.

FIELD OF THE INVENTION

The present invention relates to an agricultural product storage system including a conditioning device, for example an aeration fan, in which a control function is used to control operation of the conditioning device responsive to one or more sensed conditions relating to the stored agricultural product, for example temperature or humidity of the product, and more particularly the present invention relates to an agricultural storage system in which the control function is adaptive to vary which control function among a plurality of control functions is selected in response to a state of the storage conditions, for example in response to environmental conditions, conditions of the product, and/or the storage term of the product, etc.

BACKGROUND

In the storage of agricultural products in storage bins, for example storage of grain in a grain bin, it is common to provide an aeration fan for generating a flow of air through the storage bin to aerate the agricultural product in the storage bin. In order to operate the fan most efficiently, it is further known to provide simple control systems relying on a specified algorithm to aerate the product according to sensed conditions of the product, for example aerating the product to maintain temperature below a prescribed limit to prevent spoilage. If too much aeration is provided however, the agricultural product can be overly dried so that the moisture content is well below an ideal moisture content corresponding to an optimal price for the grain when delivered to market. In view of this, some grain storage systems involve much more complex algorithms to control operation of the fan in which the complex algorithms are dependent upon many different variables. There continues to be a problem with known fan control algorithms, however, in that the aeration strategy defined by the algorithm does not take into consideration the changing state of the product or the changing state of the bin where the product is stored. The user is thus required to manually adjust the settings for when to have fans operate as the grain condition in storage or the state of the bin changes.

SUMMARY OF THE INVENTION

According to one aspect of the invention there is provided an agricultural product storage system comprising:

a storage bin for storing an agricultural product therein;

a condition sensor associated with the storage bin so as to be arranged to sense a condition of the agricultural product in the storage bin;

a conditioning device operatively associated with the storage bin for conditioning the agricultural product in the storage bin when activated; and a controller in operative communication with the condition sensor and the conditioning device;

the controller including a memory having programming instructions and a plurality of control functions stored thereon and a processor arranged to execute the programming instructions stored on the memory so as to be arranged to:

select a first function among the control functions based upon a first state of the storage bin, in which the first function defines operation of the conditioning device according to a plurality of respective parameters;

operate the conditioning device according to the first function and in response to the condition sensed by the condition sensor while the storage bin remains in the first state;

select a second function among the control functions based upon a second state of the storage bin different that the first state, in which the second function defines operation of the conditioning device according to a plurality of respective parameters different that the first function; and operate the conditioning device according to the second function and in response to the condition sensed by the condition sensor while the storage bin remains in the second state.

According to a second aspect of the present invention there is provided a method of storage an agricultural product, the method comprising:

storing the agricultural product in a storage bin having a conditioning device operatively associated with the storage bin for conditioning the agricultural product in the storage bin;

sensing a condition of the agricultural product in the storage bin using a condition sensor associated with the storage bin;

providing a controller in operative communication with condition sensor and the conditioning device in which the controller has a memory having programming instructions and a plurality of control functions stored thereon and a processor arranged to execute the programming instructions stored on the memory;

using the controller, selecting a first function among the control functions based upon a first state of the storage bin, in which the first function defines operation of the conditioning device according to a plurality of respective parameters;

using the controller, operating the conditioning device according to the first function and in response to the condition sensed by the condition sensor while the storage bin remains in the first state;

using the controller, selecting a second function among the control functions based upon a second state of the storage bin different that the first state, in which the second function defines operation of the conditioning device according to a plurality of respective parameters different that the first function; and using the controller, operating the conditioning device according to the second function and in response to the condition sensed by the condition sensor while the storage bin remains in the second state.

The conditioning device preferably comprises an aeration fan for generating a flow of air through the storage bin to aerate the agricultural product in the storage bin. In some instance, the conditioning device may further comprise a heater or a chiller to condition the flow of air prior to introduction of the air into storage bin to further assist in conditioning of the agricultural product.

By storing a plurality of different control functions on the controller, which are each associated with a different state of the storage bin, the present invention allows the control function (and the corresponding fan control strategy represented by the function) to remain current and effective even as the storage conditions change over time. The fan controller according to the present invention is thus adaptive in real time to the current state of the bin.

The state of the storage bin which determines selection of the control function may be at least partly defined by:

(i) the condition of the product such that a change in the condition of the product may result in a change of the state of the storage bin and a change in the selected control function;

(ii) a plurality of different conditions of the product;

(iii) an environmental condition relating to a surrounding environment of the storage bin, for example an ambient temperature, an ambient moisture content, and/or forecasted weather data;

(iv) an expected storage duration of the product with the storage bin;

(v) a proximity to a scheduled date corresponding to removal of the product from storage;

(vi) a plurality of different state parameters such that a change in any one state parameter is sufficient for the controller to determine a change in the state of the bin corresponding to selection of a different one of the control functions;

(vii) data communicated to the controller from a central server over a wireless network, for example an expected storage duration of the product, a type of the product, and/or a target moisture content for the product;

(viii) data which is sensed locally at the storage bin; and/or (ix) other parameters selected by an operator of the system.

In one example, one of the parameters of the first function may be a moisture content of the product for controlling operation of the fan based on the moisture content in the first state of the bin and one of the parameters of the second function may be a temperature of the product for controller operation of the fan based on the temperature of the product in the second state of the bin. In this instance, the first state of the storage bin may correspond to the temperature of the product being within a permissible range and the second state of the storage bin may correspond to the temperature of the product being outside of the permissible range.

When the condition sensor comprises a plurality of individual sensors distributed within the storage bin, the sensed condition used by the selected control function to operate the aeration fan may be an average of individual conditions sensed by the individual sensors respectively. In the instance of plural individual sensors, the first function may control operation of the fan based on the average, however, the state of the bin which determines selection of the control function may be at least partly defined by a temperature limit associated with the individual sensors such that an individual condition sensed by any one of the individual sensors which exceeds the temperature limit results in a change of the state of the bin and a change to a second function.

When the controller comprises a base station in proximity to the storage bin and a central server that is remote from the base station so as to be in communication with the base station over a wireless network, preferably the base station is in local communication with the condition sensor associated with the storage bin such that the state of the storage bin is at least partly determined by data communicated to the base station from the central server over the wireless network.

The data communicated from the central server to the controller that determines the state of the storage bin for selection of the control function preferably includes an expected storage duration of the product, a type of the product, and a target moisture content for the product.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
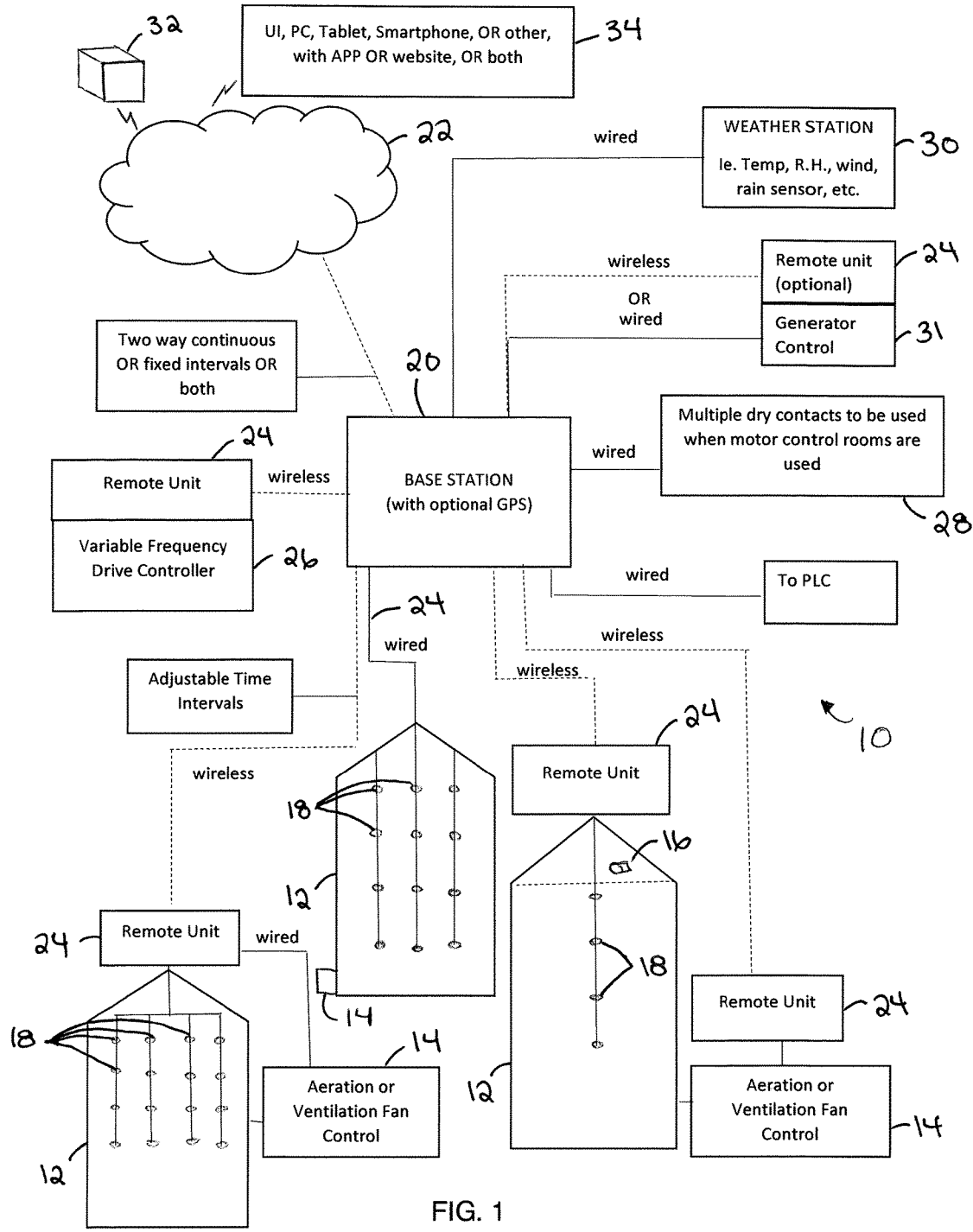
FIG. 1 is a schematic representation of the agricultural product storage system.
Figure 2:
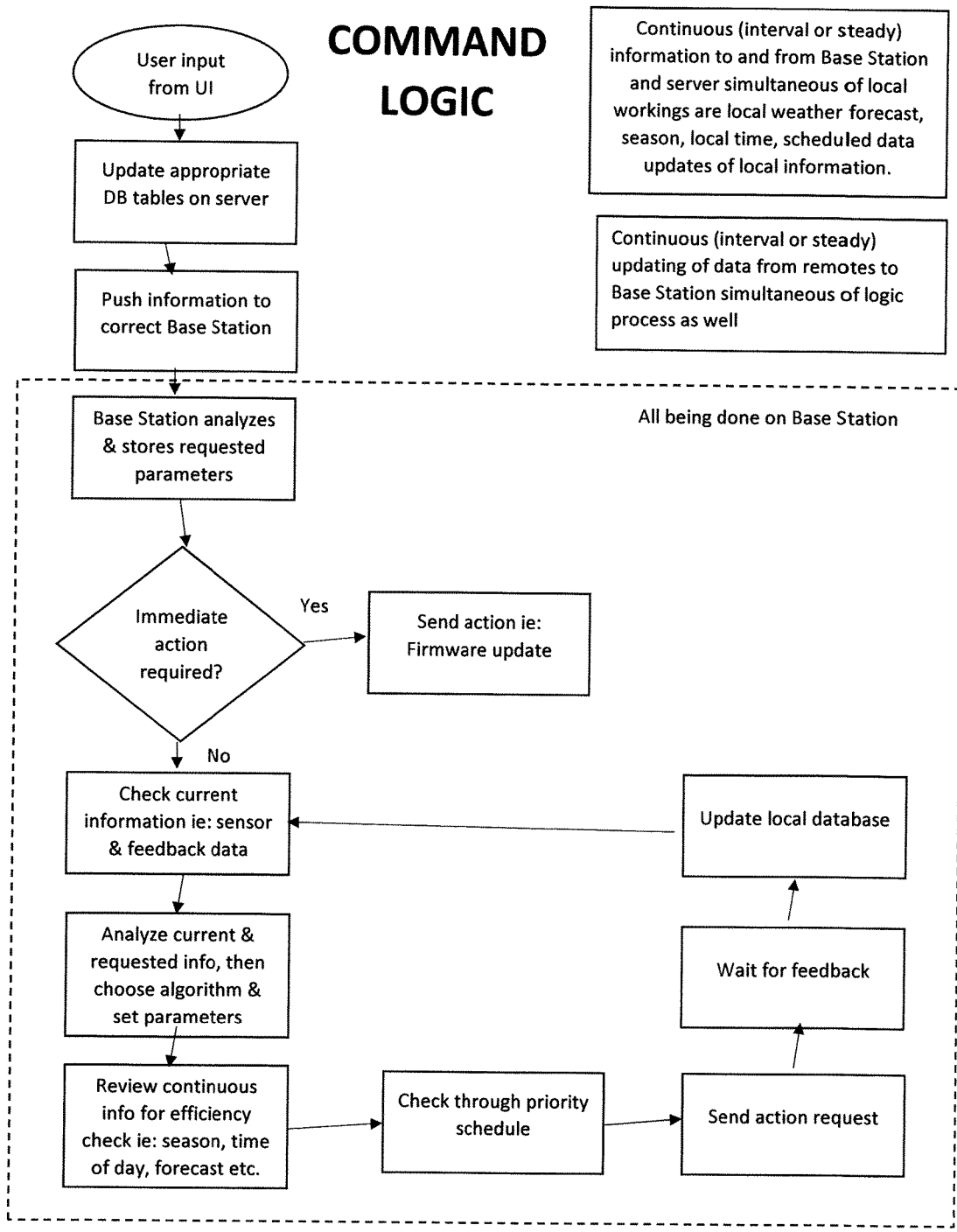
FIG. 2 is a flow chart representing the operation of the agricultural product storage system.

Referring to the accompanying figures there is illustrated an agricultural product storage system generally indicated by reference numeral 10. The system is used to control conditioning of an agricultural product, for example grain and the like, during storage prior to delivery of the product to market.

A typical storage system used at a given storage location includes a plurality of storage bins 12 at the storage location, for example conventional cylindrical grain storage bins formed of corrugated steel. Each bin has a grain conditioning device, which typically includes aeration fan 40 for generating a flow of air upwardly through the product in the storage bin to aerate the product during storage. The aeration fan is typically in communication with a bottom end of the storage bin, however, any suitable configuration to provide adequate airflow through the product is permissible. Optionally, an additional headspace fan 16 may be located within the top end of the storage bin for venting air above the stored product externally out of the headspace in the bin. In some instance, the grain conditioning device may also include a heater or a chiller in cooperation with the fan 40 for heating or cooling the aeration air prior to entering the storage bin to provide further conditioning of the product in storage.

In order to monitor conditions of the product within the bin, a sensor array is provided within each bin comprised of a plurality of individual sensors 18, each for sensing a respective individual condition of the product. A typical sensor array includes a plurality of temperature sensors for sensing temperature, moisture sensors for sensing moisture content, pressure sensors for sensing pressure (for example plenum pressure), relative humidity sensors for sensing relative humidity, and the like. The sensors may be supported along cables suspended within the product in a preferred embodiment, however any form of supporting the sensors in proximity to the product may be employed. Additional sensors may also be located within the surrounding environment of the storage bin for sensing ambient conditions such as temperature, relative humidity, wind and the like.

At each storage location, a base station 20 is typically provided in the form of a computer device having a memory and a processor for executing programming stored on the memory to at least partly function as a system controller which executes the various functions of the system as described in the following. The base station is located locally at the storage location in proximity to the storage bins and includes a suitable transceiver for wireless communication over a network 22, for example a cellular phone network, as well as being enabled for wireless and wired communication to various bin stations 24 located at each storage bin respectively.

Each bin station 24 is also a computer device having a memory and a processor for executing programming stored in the memory so as to communicate with the sensors 18 associated with that bin and to communicate that data from the sensors back to the base station 20 by wireless or wired communication means.

The storage system 10 further includes a central server 32 at a location which is remote from the storage location for communication with multiple base stations 20 at different storage locations through a common wireless communication network 22. The central server 32 also takes the form of one or more computer devices having one or more memories and one or more processors at a single location or across a distributed network for executing programming stored on the memory to assist in executing some of the various functions of the system as described in the following.

In this instance, the overall system controller for executing the various functions described herein may include functionality that is (i) executed by the base station 20 components and programming, (ii) executed by the central server 32 components and programming, and/or (iii) executed by the bin station 24 components and programming, or any combination thereof.

Communication between the cloud server 32 and the base station 20 is a two-way communication which may be continuous, or scheduled at periodic or random intervals of time. The central server includes a web interface for enabling user computer devices 34 such as personal computers or mobile computer devices of various forms belonging to a user to exchange data with the central server. For example, the operator of the storage bins at a given storage location may use their personal computer device 34 to communicate with the central server 32 over the wireless communication network 22 to upload various selected data relating to the storage of product within the respective storage bins. Selections made by the user which can be input into the central server include, for each storage bin, the duration of the storage term for storing the product before delivery to market, a target moisture level desired within the product at the completion of the storage term, and the type of product being stored.

In addition to communicating with the bin stations 24, the base station 20 may also communicate with a variable frequency drive controller 26 to control any variable fans associated within the system.

In the instance of commercial storage locations having a plurality of storage bin aeration fans operating through a main control room, the base station 20 may further include a wired connection to a panel of electrical dry contacts 28 adapted to be connected to electrical relays which operate the fans for switching the aeration fans on and off through the main control room.

The base station typically works in cooperation with a weather station 30 by a wired or wireless communication means to allow for auxiliary sensor data relating generally to the storage location to be acquired through a single set of sensors which measures wind, temperature and relative humidity for example. The weather station 30 may further include a rain sensor for detecting when it is raining. The resulting data is communicated back to the base station from the weather station 30.

The base station may also include a wired or wireless connection to a remote unit 24 in communication with a generator control 31 which interlaces with an electrical generator of the system. The generator may be a primary power source or may be a back to a main power supply for use in the event of a loss of electrical power from a main power supply. The base station at the storage location will interface with the generator through the generator control 31 to control activation of the generator as required. By monitoring the condition of the generator, the controller can determine the appropriate time to activate the various aeration fans 14 associated with storage bins at that storage location which derive their power from the generator. In the event of multiple fans which are intended to be operated at the same time, the system controller includes suitable logic stored thereon for ensuring the generator is initially activated following by actuating the fans sequentially rather than simultaneously when operating on power from a generator.

The base station 20 includes a plurality of fan control functions stored thereon in which each fan control function is associated with a respective state of the bin. Each fan control function is a function or algorithm which controls when the corresponding aeration fan is turned on or off based on respective parameters associated with that function which are input into the base station from various sources. The parameters may relate to (i) data selected by a user and input through a personal computer device 34 to the central server 32 for subsequent communication to the base station 20, (ii) data acquired by the central server by communication over a wireless communications network such as the Internet representing forecasted weather data or correlation data between various agricultural products and the moisture content thereof, (iii) data acquired by the weather station, and/or (iv) sensed conditions relating to the product being stored within a given storage bin or relating to the environment of the storage bin. One or more of the server 32, the base station 20, and/or the remote units 24 include suitable adaptive programming thereon which learns from the logged history of previous material storage, to enable smart selection of the appropriate control function to be selected throughout the storage duration such that the system controller can make better selections over time and effectively functions as an artificial intelligence unit.

In some instances, the state of the bin is defined simply by the temperature of the product exceeding a prescribed upper limit, such that the corresponding function relates merely to turning the fan on until the temperature is reduced below the corresponding limit. In other instances, a fan is cycled on and off as the ambient temperature and/or ambient relative humidity changes throughout the day for example. In further instances, the state of the bin is defined relative to the proximity to the market date corresponding to the end of the duration of storage so that moisture content is initially reduced to prevent spoilage, but moisture content is then increased closer to the market date to optimize market value of the product. In other instances, the fan may be operated to turn on only when it is most cost-efficient to use the fan over the overall duration of the storage term to eventually arrive at a target moisture content at the end of the storage term. In other instances the current or forecasted weather may be used to define the state of the bin which then determines how aggressively the aeration fan is operated.

The state of the storage bin which determines selection by the controller of the fan control function to be used may be at least partly defined by any one or more of the following: (i) the condition of the product such that a change in the condition of the product may result in a change of the state of the storage bin and a change in the selected fan control function; (ii) a plurality of different conditions of the product; (iii) an environmental condition relating to a surrounding environment of the storage bin, for example an ambient temperature, an ambient moisture content, and/or forecasted weather data; (iv) an expected storage duration of the product with the storage bin; (v) a proximity to a scheduled date corresponding to removal of the product from storage; (vi) a plurality of different state parameters such that a change in any one state parameter is sufficient for the controller to determine a change in the state of the bin corresponding to selection of a different one of the fan control functions; (vii) data communicated to the base station from a central server over a wireless network, for example an expected storage duration of the product, a type of the product, and/or a target moisture content for the product; (viii) data which is sensed locally at the storage bin; and/or (ix) other parameters selected by an operator of the system.

In use, an operator of storage bins at a given storage location, initially communicates with the central server over the wireless communication network 22 using their personal computer device 34, for example a desktop, laptop, tablet, or smartphone, to input basic information such as the type of product being stored at each bin, the target properties of the product such as moisture content, and to the target date corresponding to the end of the storage term for delivery of the product to market.

The server uses the input information to be communicated to the base station while at the same time confirming that appropriate data and fan control functions corresponding to the products to be stored are updated from the server to the respective base stations. The base station at a given storage location will then store the information received and acquire additional data from the storage bins to begin evaluating the state of the bin which in turn determines which fan control function is selected for each bin to determine operation of the corresponding fan. Some of the evaluation may also take place at the server 32.

The base station 20 and/or server 32 continues to monitor data from sensors on the bins as well as external data including weather station information and other relevant updates from the central server to continue to determine the optimal fan control function to be used in real time. If any data is believed to be out of date, updates can be obtained from the central server at any time. If any action is determined to be required by the system controller, appropriate action can be taken to activate corresponding fans or acquire additional data as required. Once a fan control function has been selected, the system controller determines the appropriate parameters to be evaluated for that corresponding fan control function that is been selected. Up-to-date information relating to each of the parameters defined by the selected fan control function is acquired which can include various conditions of the product and the storage bin as described above. The various data sensed by the sensors are compared to limits and averages are evaluated when multiple sensors of the same type acquire data from the same storage bin. Appropriate limits may be defined for individual sensors and for the overall average of data from multiple sensors so that appropriate action can be taken by selecting a different fan control function if any one of the limits is exceeded.

The system controller keeps a current priority list of criteria to be evaluated at all times so that the fan control function is selected based on the most urgent criteria in each instance. When the fan control function determines that a fan must be actuated, the base station sends instructions through a suitable remote unit or bin station 24 to the corresponding aeration fan to activate the fan. The system further acquires feedback information to be recorded at a local database and communicated back to the central server to form a log of all activity and actions undertaken by the base station and all sensed conditions in the monitoring and conditioning of the product being stored.

The headspace fan may be interlocked with the aeration fan, to turn on when the aeration fan turns on and also be able to be independent when the conditions require it to turn on, the conditions being headspace dew point, RH, and temperature.

The generator control will typically have an algorithm for the base station to know how long a generator needs to turn on for to start up.

Future development for VFD control is to be able to adjust fan CFM when you have too much static pressure or you need to slow down when conditions are right but can't shut down completely in case crust starts to form.

When managing grain, the first order of business always, is to make sure that there is not any spoilage. After the system has prioritized no spoiling, the next priority is to be able to sell the grain, at a desired time period, rather than be forced to sell grain due to storage considerations. In addition to selling grain at the right time frame, it is further desirable to sell grain as close to the maximum moisture content allowed as possible. The system is thus controlled by the system controller using natural air drying or rehydration systems, and controlling temperature, and moisture content, by running fans appropriately to do that.

Examples of algorithms are defined in the following.

Algorithm 1 may be natural air drying in which the natural air drying algorithm maximizes fan run time in the best available conditions. Natural air drying runs to a moisture. You specify a temp range and an equilibrium moisture content (EMC) range and a plenum EMC range. The equilibrium moisture content (EMC) of a hygroscopic material surrounded at least partially by air is the moisture content at which the material is neither gaining nor losing moisture. The value of the EMC depends on the material and the relative humidity and temperature of the air with which it is in contact. In this instance, for example, if we had for 14% EMC air, and we had a bin of wheat, or any other grain for that matter as well, if we ran the fan for a long enough period of time, the entire bin of wheat would be at 14%. That would be a very long time. In another example, if canola has 6% MC, the system will run the fan when the EMC is 7, or 6.5 maybe 7, up to as high as wet as the air gets without raining. So then after a while, the bottom layer gets up to 6.5, then the system runs only if the EMC is 7 or higher in the plenum. And then if it gets up to 8 the system only runs if the EMC is 7.5 or higher. Things to be aware of when using this method are: (i) if the bottom layer is 8% and the layer above it is at 5% you may still be better off running 7% air in to boost the next layer (plus 7% air is easier to come by for certain locations than 8% air); (ii) the system should be cautious how fast the lower limit is moved up because if too quickly the fans will not run much at all very quickly; (iii) Playing to the average of the whole bin is better if you have the time (i.e.: the bottom layer is 8% but the rest is 5% well much better off leaving the lower limit down around 7% to help the rest of the bin out); (iv) a misconception in the market is farmers think if they have their desired value set at 14% that the fans should never run above that but it is playing to the average of the whole bin so at times you will want that. When Drying—the lower limit should be set to zero so that the fans will always run when the air is dry and the high limit is set appropriately based on the grain current EMC. The high limit then could become a moving limit if the ranges were tight enough that it was worth having the high limit close to the current.

Algorithm 2 may be a simplified natural air drying using no feedback at all. It looks at the weather station, and it calculates the plenum EMC, and temperature, and runs to that, nothing else.

Algorithm 3 may be aeration running to a temperature. This assumes that the moisture content is about where we want it to be, and what you're trying to do is to manage the temperature, normally cool while holding the moisture content. This algorithm takes the average temperature of the grain in the bin and uses that for a reference value. It uses ambient EMC value, and plenum temperature as the comparators against the in-bin average temp. If the values of EMC and plenum temp allow it to cool without drying the grain it turns on the fan. If the temp was acceptable but the EMC was not then it will not run. Things to consider for this algorithm are (i) the location of the grain (if it is in a place that historically gets very few cool days then it will take advantage of those days regardless of EMC and try to rehydrate after if it dries to much); (ii) timing to market needs to be considered as well; (iii) cooling grain evaporates or dries out the grain (example: 30 degree grain cooled down to 5 degrees using 15% EMC air the whole time will lose 1.5% moisture in the grain which means you have to run at 16.5% EMC air if you want to hold the 15% EMC at 5 degrees); and (iv) big bins with fan warming may not have the evaporation effect when cooling as stated above. Eventually the system will need to decide the appropriate algorithm to use based on when it started, where it is, how long to market etc. Knowing the season and location are important for typical temps to expect and daylight hours and what is coming, like winter or summer. So, if there is lots of cooling to do and winter is around the corner maybe some of the cooling can wait. The system can thus be adapted to have different variations of the algorithms for different parts of the world, i.e.: cool climate, warm climate, hot climate, and all north or south of the equator. The values from in the bin being used will typically be min max and average of what is in the grain. We will try throwing out the highest and throw out the lowest, and then average in one example. Although live data is typically relied on to evaluate the state of the bin, the system may do some logic using weather forecasted data, but this will need to be sent to the Base Station from the Server. Typically, the system will store at least 24 hours worth of the latest data on the Base Station at all times but a week or a month of data could be readily stored to use in the future.

Algorithm 4 may involve fast drying using a burner and/or turning of grain. In this instance the system turns on the burner and runs 100 Degrees F. of heat rise. Example: We are at 18 and our target is 14 so we need to remove X amount of water out and we run a fixed amount per hour. The burner runs until the target is reached. Time of day also needs to be in consideration when using algorithms because, for example, if it is 3 pm and parameters are met and all we will get is 15 minutes of run time then there is no point in turning on the fan.

Algorithm 5 may include use of a chiller to cool the grain. This would be used in very hot climates. A historicise would be applied, meaning that every sensor in the grain needs to be below a set point before the chiller will automatically shut down. In most cases, this would be the sensor nearest to the surface of the grain but not always. This is because every sensor would need to be cool even if some over cool because if the aeration fan is at the bottom it is likely to cool the bottom sensors way more than needed by the time the top sensors reach the lower desired temp. It is then easy to bring the bottom sensors back up to desired temp because of the warm climate.

Rain, time of day and power priority are things that can change the state of the bin and interrupt an algorithm to cause selection of a new fan control function.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. An agricultural product storage system comprising:
   a storage bin for storing an agricultural product therein;
   a condition sensor associated with the storage bin so as to be arranged to sense a condition of the agricultural product in the storage bin;
   a conditioning device operatively associated with the storage bin for conditioning the agricultural product in the storage bin when activated; and
   a controller in operative communication with the condition sensor and the conditioning device;
   the controller including a memory having programming instructions and a plurality of control functions stored thereon and a processor arranged to execute the programming instructions stored on the memory so as to be arranged to:
   select a first function among the control functions based upon a first state of the storage bin, in which the first function defines operation of the conditioning device according to a plurality of respective parameters;
   operate the conditioning device according to the first function and in response to the condition sensed by the condition sensor while the storage bin remains in the first state;
   select a second function among the control functions based upon a second state of the storage bin different that the first state, in which the second function defines operation of the conditioning device according to a plurality of respective parameters different that the first function; and
   operate the conditioning device according to the second function and in response to the condition sensed by the condition sensor while the storage bin remains in the second state.

2. The system according to claim 1 wherein the state of the storage bin which determines selection of the control function is at least partly defined by the condition of the product such that a change in the condition of the product may result in a change of the state of the storage bin and a change in the selected control function.

3. The system according to claim 1 wherein the state of the storage bin which determines selection of the control function is at least partly defined by a plurality of different conditions of the product.

4. The system according to claim 1 wherein one of the parameters of the first function is a moisture content of the product for controlling operation of the fan based on the moisture content in the first state of the bin and wherein one of the parameters of the second function is a temperature of the product for controlling operation of the fan based on the temperature of the product in the second state of the bin, the first state of the storage bin corresponding to the temperature of the product being within a permissible range and the second state of the storage bin corresponding to the temperature of the product being outside of the permissible range.

5. The system according to claim 1 wherein the state of the storage bin which determines selection of the control function is at least partly defined by an environmental condition relating to a surrounding environment of the storage bin.

6. The system according to claim 5 wherein the environmental condition includes an ambient temperature.

7. The system according to claim 5 wherein the environmental condition includes an ambient moisture content.

8. The system according to claim 5 wherein the environmental condition comprises forecasted weather data.

9. The system according to claim 1 wherein the state of the storage bin which determines selection of the control function is at least partly defined by an expected storage duration of the product with the storage bin.

10. The system according to claim 1 wherein the state of the storage bin which determines selection of the control function is at least partly defined by a proximity to a scheduled date corresponding to removal of the product from storage.

11. The system according to claim 1 wherein the state of the storage bin which determines selection of the control function is defined by a plurality of different state parameters and wherein a change in any one state parameter is sufficient for the controller to determine a change in the state of the bin corresponding to selection of a different one of the control functions.

12. The system according to claim 1 wherein the condition sensor comprises a plurality of individual sensors distributed within the storage bin, and wherein the sensed condition used by the selected control function to operate the aeration fan is an average of individual conditions sensed by the individual sensors respectively.

13. The system according to claim 12 wherein the state of the bin which determines selection of the control function is at least partly defined by a temperature limit associated with the individual sensors such that an individual condition sensed by any one of the individual sensors which exceeds the temperature limit results in a change of the state of the bin.

14. The system according to claim 1 wherein the controller comprises a base station in proximity to the storage bin and a central server that is remote from the base station so as to be in communication with the base station over a wireless network, wherein the base station is in local communication with the condition sensor associated with the storage bin and wherein the state of the storage bin is at least partly determined by data communicated to the base station from the central server over the wireless network.

15. The system according to claim 14 wherein the state of the storage bin which determines selection of the control function is defined by both (i) the data communicated to the controller from the central server over the wireless network and (ii) data which is sensed locally at the storage bin.

16. The system according to claim 14 wherein the data communicated from the central server to the base station that determines the state of the storage bin for selection of the control function includes an expected storage duration of the product, a type of the product, and a target moisture content for the product.

17. The system according to claim 1 wherein the conditioning device comprises an aeration fan for generating a flow of air through the storage bin to aerate the agricultural product in the storage bin.

18. The system according to claim 1 wherein the conditioning device comprises a heater.

19. The system according to claim 1 wherein the conditioning device comprises a chiller.

20. A method of storage an agricultural product, the method comprising:
    storing the agricultural product in a storage bin having a conditioning device operatively associated with the storage bin for conditioning the agricultural product in the storage bin;
    sensing a condition of the agricultural product in the storage bin using a condition sensor associated with the storage bin;
    providing a controller in operative communication with condition sensor and the conditioning device in which the controller has a memory having programming instructions and a plurality of control functions stored thereon and a processor arranged to execute the programming instructions stored on the memory;
    using the controller, selecting a first function among the control functions based upon a first state of the storage bin, in which the first function defines operation of the conditioning device according to a plurality of respective parameters;
    using the controller, operating the conditioning device according to the first function and in response to the condition sensed by the condition sensor while the storage bin remains in the first state;
    using the controller, selecting a second function among the control functions based upon a second state of the storage bin different that the first state, in which the second function defines operation of the conditioning device according to a plurality of respective parameters different that the first function; and
    using the controller, operating the conditioning device according to the second function and in response to the condition sensed by the condition sensor while the storage bin remains in the second state.

* * * * *